Aug. 1, 1967 F. A. WETTSTEIN 3,333,513
GUIDE ARRANGEMENT FOR PISTONS AND CYLINDERS
Original Filed Dec. 30, 1963 4 Sheets-Sheet 1
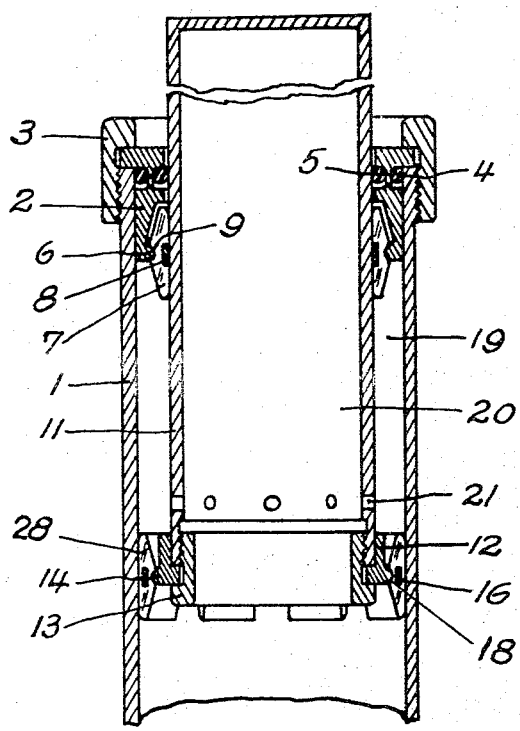
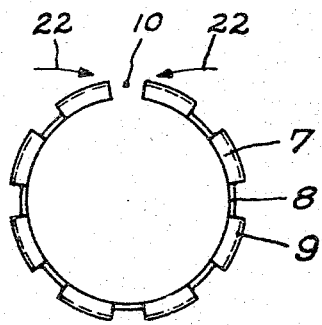
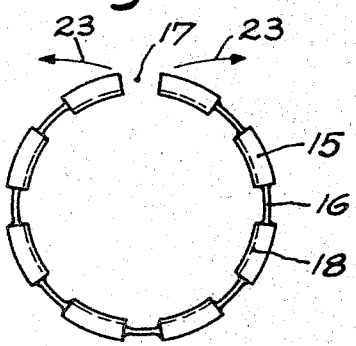
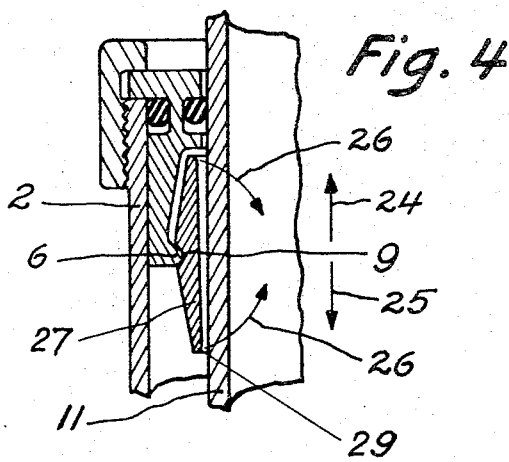
INVENTOR
F. A. WETTSTEIN
BY Michael S. Striker
ATTORNEY Aug. 1, 1967   F. A. WETTSTEIN   3,333,513
GUIDE ARRANGEMENT FOR PISTONS AND CYLINDERS
Original Filed Dec. 30, 1963   4 Sheets-Sheet 2
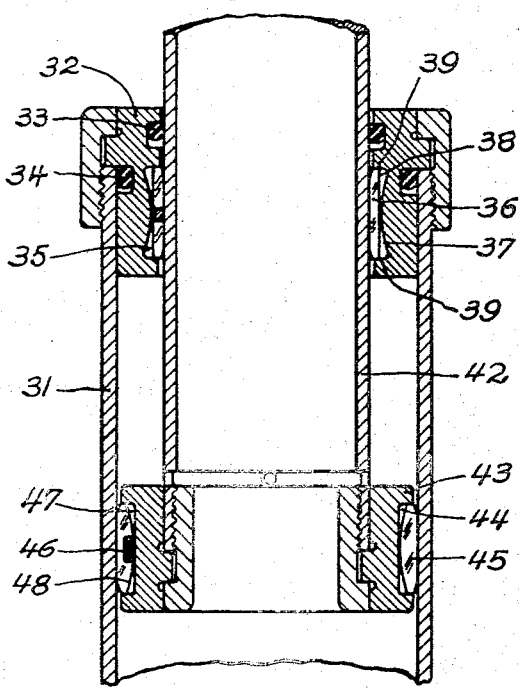
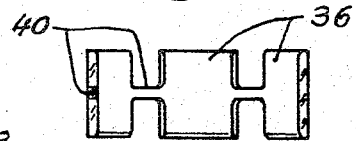
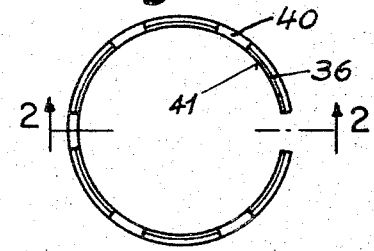
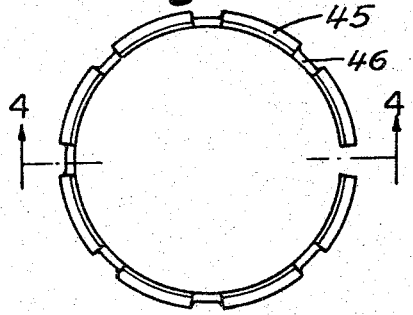
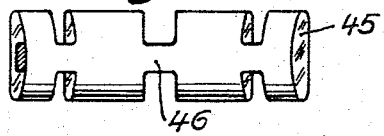
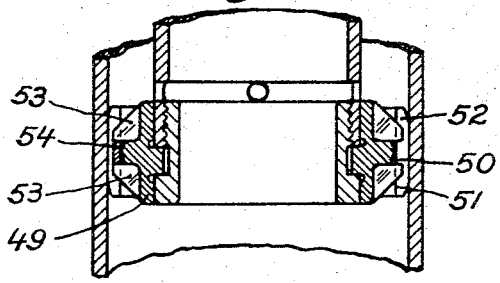
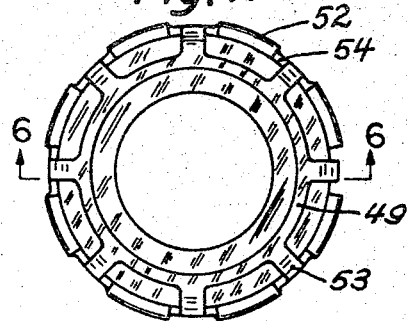
INVENTOR
F. A. WETTSTEIN
BY Michael S. Striker
ATTORNEY Aug. 1, 1967  F. A. WETTSTEIN  3,333,513
GUIDE ARRANGEMENT FOR PISTONS AND CYLINDERS
Original Filed Dec. 30, 1963  4 Sheets-Sheet 3
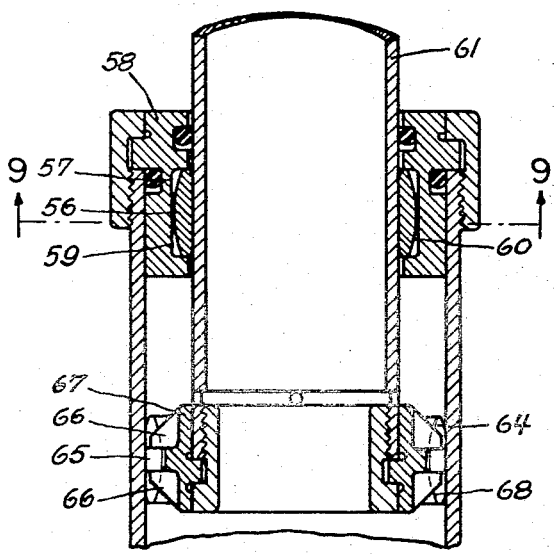
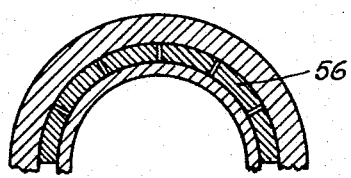
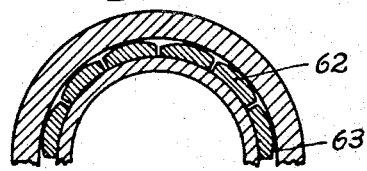
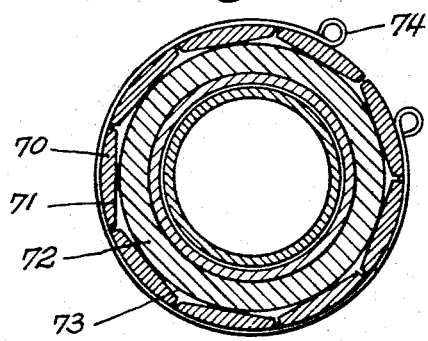
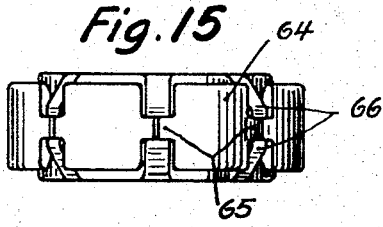
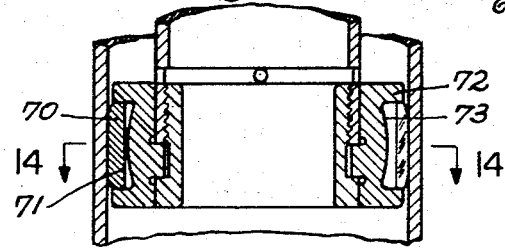
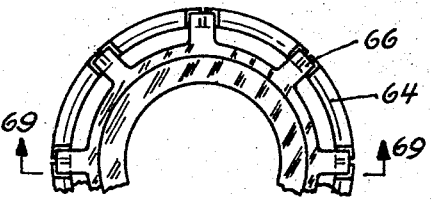
INVENTOR
F. A. WETTSTEIN
BY Michael S. Striker
ATTORNEY

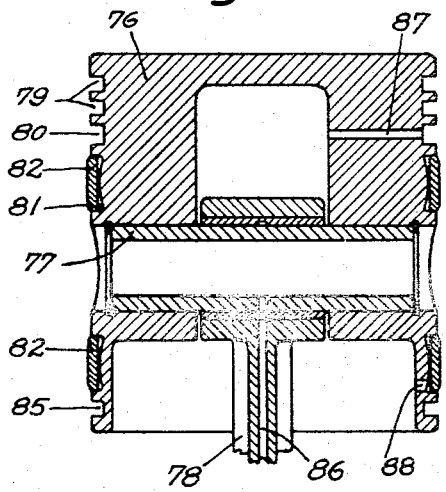
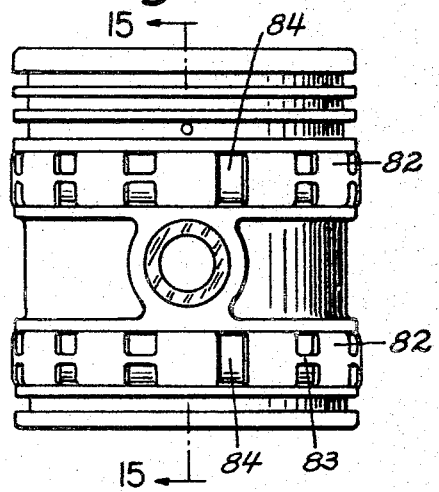
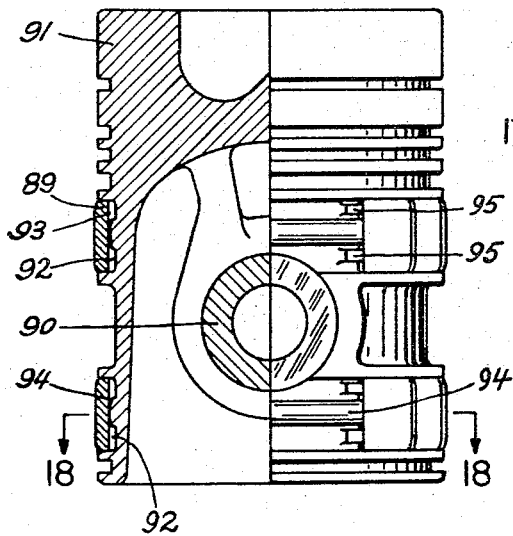
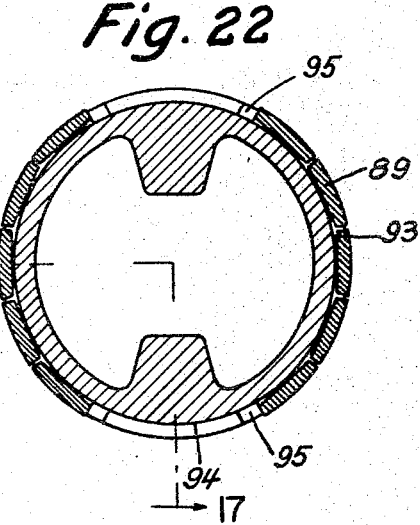

United States Patent Office 3,333,513
Patented Aug. 1, 1967

3,333,513
GUIDE ARRANGEMENT FOR PISTONS AND CYLINDERS
Fritz Alexander Wettstein, Kreuzstrasse, Stafa, Zurich, Switzerland
Continuation of application Ser. No. 334,389, Dec. 30, 1963. This application June 27, 1966, Ser. No. 560,832
Claims priority, application Germany, Jan. 15, 1963, W 33,711; July 19, 1963, W 34,915
10 Claims. (Cl. 92—165)

ABSTRACT OF THE DISCLOSURE

A guide arrangement for piston and cylinder elements arranged on a common axis and adapted for mutually reciprocating motion and comprising a plurality of circumferentially arranged glide blocks and a circular support member for supporting the glide blocks.

This application is a continuation of application Ser. No. 334,389, filed on Dec. 30, 1963, and now abandoned.

The invention refers to a guide arrangement for pistons and cylinders with reciprocating motion and a plurality of interconnected glide blocks arranged around the cylinder axis and having a common cylindrical gliding surface.

A resilient guide arrangement for pistons and cylinders is known, whereby a plurality of glide blocks with a common cylindrical gliding surface are interconnected by means of a central flange and whereby said flange is movably retained in a groove of a supporting element. This arrangement requires the guide element to be divided into two parts with correspondingly increased costs of production. Due to the clearance required between the flange and the groove the accuracy with which flange and glide blocks are centered is diminished.

These disadvantages are avoided by the design according to the present invention. In this design the glide blocks are interconnected by means of at least one in radial direction comparatively thin resilient stay, whereby an opening is provided at one place of the circumference so that a resilient annular guide element is obtained, which by means of radial compression or expansion readily may be inserted into an undivided groove.

Examples of the invention are described in the following with reference to the drawings.

FIG. 1 is a longitudinal cross section through a piston and cylinder arrangement for reciprocating motion,
FIG. 2 is an end view of an open, annular, radially resilient guide element of the cylinder,
FIG. 3 is a guide element similar to FIG. 2 but adapted for the piston,
FIG. 4 shows part of FIG. 1 in an enlarged scale,
FIG. 5 shows part of an axial cross section through a piston and cylinder assembly with guides in accordance with the invention,
FIG. 6 shows a longitudinal section through the upper guiding element according to line 2—2 of FIG. 7,
FIG. 7 shows an end view of the guiding element according to FIG. 6,
FIG. 8 shows a longitudinal section of the lower guiding element according to line 4—4 of FIG. 9,
FIG. 9 shows an end view of the guiding element according to FIG. 8,
FIG. 10 shows a longitudinal section through another guiding element according to line 6—6 of FIG. 11,
FIG. 11 shows an end view on the guiding element of FIG. 10 as seen from below,
FIG. 12 shows part of an axial longitudinal section through a piston and cylinder assembly with still another modification of the guiding element with loose glide blocks,
FIG. 13 shows part of a cross section of the upper guiding arrangement of FIG. 12 according to line 9—9,
FIG. 14 shows another form of a guiding element similar to FIG. 13,
FIG. 15 shows a side view of the lower guiding arrangement according to FIG. 12,
FIG. 16 shows part of an end view of the piston guide according to FIG. 12,
FIG. 17 shows a longitudinal section through a further modification of the invention with loose glide blocks as piston guides.
FIG. 18 shows a cross section through the piston arrangement of FIG. 17 along line 14—14 including assembly arrangement,
FIG. 19 shows a longitudinal section through a floating piston according to line 15—15 of FIG. 20 including guiding arrangements,
FIG. 20 shows a side view of the piston according to FIG. 19,
FIG. 21 shows a floating piston for a diesel engine with guiding arrangements, partly in side view and partly in longitudinal section according to lines 17—17 of FIG. 22,
FIG. 22 shows a cross section through the piston of FIG. 21 according to lines 18—18.

FIG. 1 shows a cylinder 1 at the top of which a supporting element 2 is attached by means of a ring nut 3. In the upper part of the supporting element 2 two packing rings 4 and 5 are arranged. The lower part of the supporting element 2 forms a flange 6, which by means of a groove 18 (FIG. 3) retains a guide element 7. As may be seen from FIG. 2, the guide element 7 consists of a plurality of glide blocks 27 which at their central part are interconnected by means of relatively thin resilient stays 8. At their outside, the glide blocks 27 are further provided with a groove 9 which in cross section forms part of a circle. An opening 10 is provided at one place of the circumference of the guide element 7.

The guide element 7 serves as guide for a piston rod 11, consisting of a tube, at the lower end of which a further supporting element 12 is attached by means of a ring nut 13. As may be seen from FIG. 3 the glide blocks 15 have a common cylindrical gliding surface. Also these glide blocks are interconnected by means of comparatively thin resilient stays 16 to form an annular ring which at one place of its circumference is provided with an opening 17.

At their inside intermediate section, the glide blocks 15 are further provided with a groove 18. The lower outer part of the supporting element 12 forms an annular flange 14 which is adapted to contact the glide blocks 15 at their inside groove 18, which in cross section forms part of a circle.

Chambers 19 and 20 formed between cylinder 1 and the hollow piston rod 11 are filled with a liquid and communicate with each other by means of openings 21.

The purpose and the operation of the arrangement shown in FIGS. 1 to 3 are as follows.

The piston rod 11 is guided in the cylinder 1 partly by means of guide element 7 and partly by means of the guide element 28. A comparatively high degree of resiliency of the annular guide rings formed by the glide blocks 7 and 28 is obtained partly due to the fact that the interconnecting stays 8 and 16 are of comparatively small cross section and partly due to the fact that the annular guide rings 27 and 15 are open at the places marked by 10 and 17 of their circumference. The resiliency of the guide rings 7 and 28 has a twofold purpose. On the one side it renders possible the assembly of the guide rings on their supporting elements and on the other hand it makes possible an adjustment of the glide blocks relative to the surfaces over which they glide.

For the assembly of the guide element 7 on its supporting element 2, the guide element 7 is compressed as indicated by arrows 22. When assembled, the flange 6 of the supporting element 2 contacts the groove 9 of the guide element 7. The guide element 7 and the supporting element 2 are so designed that a resiliently movable interconnection is obtained without any radial clearance. The radial clearance between the piston rod and its guide arrangement is therefore only determined by the clearance required between the glide blocks 7 and the gliding surface on the piston rod 11 for the formation of a supporting liquid film.

The assembly of the guide element 28 is effected in a similar way. For this purpose the guide element 28 is expanded as indicated by arrows 23 so that the guide element 28 and the supporting element 12 may contact each other by means of groove 18 and flange 14. Also in this case the radial clearance is limited to the clearance required for the formation of a supporting liquid film between the glide blocks 15 and the cylinder 1.

The resilient contact between the guide elements 7 and 28 and the supporting elements 2 and 12 has the additional advantage of reducing the cost of manufacture. In the previously known design of the guide element including a solid flange it is necessary to provide a clearance also between the guide element and the supporting element.

This increases the number of tolerances which have to be observed with a corresponding increase in the cost of manufacture. The resiliency of the guide elements also makes possible the adjustment of the glide blocks 7 and 28 with regard to the gliding surfaces over which they glide. This is of prime importance for the formation of supporting liquid films between the glide blocks and the gliding surfaces and consequently also for the friction and the duration of life for the guiding arrangement.

The adjustment of the glide blocks and the formation of supporting liquid films is clearly shown in FIG. 4. During a downward movement of the piston rod 11 as indicated by arrow 25, the liquid which due to the roundings 29 provided at the axial ends of the gliding blocks 7 is induced between the glide blocks 7 and the piston rod 11, will create an excess pressure near the upper end of the glide blocks 7. This excess pressure will slightly tilt the glide blocks 7 as indicated in FIG. 4, whereby the film thickness and the angle of inclination for the sake of clearness are shown in an exaggerated way. A wedge-shaped liquid film is thus formed between the glide blocks 7 and the piston rod 11. From the classical theory for glider bearings it is known that very high pressures may be produced in such wedge-shaped liquid films with a correspondingly high supporting capacity. This largely prevents metallic contact between the opposite gliding surfaces, resulting in a correspondingly small amount of friction and a long duration of life for the guiding arrangement.

During the following upward movement of the piston rod 11 as indicated by arrow 24, the glide blocks 7 will tilt in the opposite direction so that again a wedge shaped supporting liquid film is obtained. The adjustment of the glide blocks for opposite relative motion between piston and cylinder consists of a small tilting action of the glide blocks around the line of contact between the flange 6 and the groove 9, such as is indicated by the arrows 26. The adjustment of the glide blocks will thereby be obtained so much easier and so much safer the smaller the distance between the line of contact and the gliding surface. Also in this respect the design of the guiding arrangement according to the above description is superior to the previously known arrangement where the distance between the axis of rotation of the glide blocks and the gliding surface of necessity must be greater.

In principle it also would be possible to provide the flange on the glide block and the groove in the supporting element. Instead of interconnecting the glide blocks by means of resilient stays, the glide blocks may be arranged on an open resilient annular member whereby the tilting action of the glide blocks may be obtained by rotation on the annular member, the tangential position of the gliding blocks remaining thereby unchanged.

FIG. 5 shows a cylinder 31 at the upper end of which a supporting element 32 is attached. In the upper part of the supporting element 32 packing rings 33 and 34 are arranged. At the inner side of the supporting element 32 a groove 35 is provided in which groove a series of glide blocks 36 are movably supported. The bottom surface 37 of the groove 35 is saddle shaped. The cylindrical outer surface 38 of the glide blocks 36 is resiliently contacting the bottom surface 37 of the groove 35. The axial end surfaces of the groove 35 and the glide blocks 36 are preferably flat, whereby a small axial clearance is provided between the glide blocks 36 and the groove 35. As shown by FIGS. 2 and 3, the glide blocks 36 are resiliently interconnected by means of stays 40 of comparttively small cross section. The annular ring of glide blocks thus obtained has an opening at one place of its circumference. This makes it possible to insert the glide block ring into the groove 35 of the supporting element, whereby the glide block ring is resiliently compressed.

The inner surface 41 of the gliding blocks 36 and the interconnecting stays 40 form part of a common cylinder, whereby this cylindrical surface towards its axial ends is rounded off as shown by FIGS. 5 and 6.

At the inside of the glide blocks 36 a hollow piston rod 42 is arranged, whereby a gliding clearance is provided between the glide blocks and the piston rod. The clearance between the supporting element 32 and the piston rod 42 is larger than the clearance between the glide blocks 36 and the piston rod 42, so that the piston rod 42 is only guided by the glide blocks 36.

To the lower end of the piston rod 42 a supporting element 43 is attached. In a groove 44 of the supporting element 43 a guiding arrangement consisting of glide blocks 45 and elastic connecting stays 46 is resiliently supported. The design of this guiding arrangement is shown in FIGS. 4 and 5. As a further possible modification of the invention the contacting surface 47 of the groove 44 is cylindrical while the contacting surface 48 of the glide blocks 45 is saddle-shaped.

For the operation of the arrangement described above, the ability of the glide blocks for resilient adjustment is of great importance. This ability of the glide blocks is partly due to the comparatively small cross section of the interconnecting stays and partly due to the opening provided at one place of the circumference of the guiding ring. The ability for adjustment of the glide blocks depends further on the design of the support of the glide blocks. By providing contact surfaces of different curvature at the glide blocks and the supporting element, each glide block is allowed to tilt slightly around an axis forming a tangent to the intermediate circle of contact between the glide blocks and the supporting element.

In operation, the cylinder 31 and the hollow piston rod 42 are entirely or partly filled with a lubricating hydraulic fluid. During a reciprocating motion between the piston rod 42 and the cylinder 31, the viscosity of the hydraulic fluid causes this fluid to be drawn into the working clearance between the glide blocks and their opposite gliding surface. Due to the rounding-off at the axial ends of the glide blocks, an excess pressure is thereby produced at the place of entrance of the liquid film, which causes the glide blocks to tilt slightly. This produces a wedge-shaped film of lubricating fluid between the glide blocks and the surface over which they glide. Such wedge-shaped fluid films are capable of producing very high pressures. This provides the glide blocks with a large supporting capacity so that even for large lateral guiding forces metallic contact is avoided between the glide blocks and the piston rod and the cylinder respectively. This means small friction losses, small temperature increase and little abrasion of the gliding surfaces.

While the glide block rings primarily serve as a guiding arrangement, they may in some cases also serve as sealing elements. For this purpose, the resilient intermediate stays 40 are provided with the same radial thickness as the glide blocks 36, as may for example be seen from FIGS. 5, 6 and 7. At the same time the circumferential clearance at the opening of the glide block ring is reduced to a minimum. For glide block rings arranged on pistons, this clearance may be reduced to the same amount as with piston sealing rings.

The FIGS. 10 and 11 show a further example of modification of the invention. In this case the supporting element 49 is provided with barrel-shaped or spherical contacting surface 50, while a cylindrical surface of contact 51 is provided for the glide block ring 52. The supporting element 49 is provided with noses 53 which hold interconnecting stays 54 between the gliding blocks 52 with a certain clearance. Similarly as with the earlier described modification, also this arrangement allows a tilting action of the glide blocks 52 on the contacting surface 50, which again renders possible the formation of wedge-shaped supporting liquid films between the glide blocks 52 and the cylinder.

In another modification, shown in FIGS. 12 and 13, loose glide blocks 56 are supported movably in a groove 57 of a supporting element 58. In this case, the contacting surface 59 of the groove 57 is part of a cylinder and the contacting surface 60 of the glide blocks 56 is part of a common barrel-shaped or spherical surface. Also in this case the glide blocks 56, during operation of piston and cylinder, may again perform a tilting movement, so that again a supporting liquid film may be formed between the gliding blocks 56 and the piston rod 61.

As may be seen from FIG. 14, the supporting surface 63 of the glide block 62 may be curved more in the circumferential direction than was the case in FIG. 13 so that contact between the glide block 62 and the supporting element 58 takes place only at one point. The glide blocks 62 are therefore free to adjust themselves in all directions. The glide blocks 62 may thus not only perform the tilting action for creating the supporting liquid film but they also are capable to adapt themselves to irregularities in the surface of the piston rod 61 or to elastic deformations under side loads.

The lower part of FIG. 12, together with FIGS. 15 and 16, shows a further modification with loose glide blocks 64. The glide blocks 64 are provided with lateral protrusions 65 which are held by noses 66 of the supporting element 67. The contacting surface 68 of the glide block 64 is saddle-shaped and the contacting surface of the supporting element 67 is cylindrical. The glide blocks 64 are therefore again free to tilt for producing the supporting wedge-shaped liquid film. In the modification shown in FIGS. 17 and 18, loose glide blocks 70 with flat contacting surfaces 71 are supported by a supporting element 72 having a barrel-shaped or spherical contacting surface 73. The glide blocks 70 are therefore free to adjust themselves in all directions. FIG. 18 shows further an assembly tool 74, consisting of a resilient, on one side open sheet metal ring. This tool facilitates the assembly of the loose glide blocks 70 in the groove of the supporting element 72. The tool 74 holds the glide blocks 70 against the contacting surface 73 of the groove in the piston 72 during assembly. When the piston 72 together with the glide blocks 70 is inserted into its cylinder, the tool 74 will be retained at the entrance of the cylinder.

The guiding arrangements shown in FIGS. 5 to 18 differ from those shown in FIGS. 1–4 in the design of the support between the glide blocks and the supporting elements and in the design of the axial fixation of the glide blocks. In earlier designs, the support of the glide blocks and their fixation in an axial direction was obtained by means of special grooves and flanges on the gliding blocks and the supporting elements. In the new designs, the axial fixation is instead provided directly at the axial end surfaces of the glide blocks, their interconnecting stays or lateral protrusions. The radial support between the glide blocks and the supporting element is through direct contact between one side of the glide block, forming a contacting surface of simple form, and a contacting surface on the supporting element of equally simple form. The elimination of special grooves or flanges on the glide blocks results in a simplification in the form of the glide blocks with decreased costs of manufacture and facilitated tolerance control. In many cases, the new design requires less space in radial direction. Further, the inertia forces of the reciprocating glide blocks are taken up directly, whereas with previous designs inertia forces and supporting forces may cause tilting moments on the glide blocks. Similar moments are obtained when the glide block ring simultaneously serves as a sealing element.

FIGS. 19 to 22 show floating pistons for combustion engines, compressors and similar engines.

FIGS. 19 and 20 show a floating piston 76 with piston pin 77 and piston rod 78. On the upper part of piston 76, grooves 77 are provided for the piston rings and a larger groove 80 for the oil ring. In grooves 81 on both sides of the piston pin 77 guide rings are arranged consisting of glide blocks 82, which are interconnected by means of resilient stays 83. On one place 84 of their circumference the guide rings are open so that they may be assembled in their grooves 81 in the same manner as piston rings. However, while piston rings are so designed that they exercise a pressure on the surrounding cylinder wall, the guide rings are so designed that they resiliently contact the contacting surface at the bottom of the grooves 81. At their outside, the guide rings 82–83 have a cylindrical gliding surface, which is rounded off towards the axial ends of the guide rings. In axial direction, the guide rings are limited by planes perpendicular to the piston axes and a small axial clearance is provided between the guide rings and the piston grooves. The inner or contacting surface of the guide rings 82–83 forms part of a cylinder and the bottom of grooves 81 forms part of barrel-shaped or spherical surfaces. At the lower end of the piston 76, a groove 85 is preferably provided for another oil ring. Through an opening 86 in the piston rod 78 and the hollow piston pin 77, pressure oil may be admitted to the guide rings. This oil is allowed to return to the motor housing through holes 87 and 88.

The outer diameter of the guide rings 82–83, when contacting the piston 76, is somewhat larger than the outer diameter of the piston 76, which, for the sake of clearness, is shown in an exaggerated way in FIGS. 19 and 20. The floating piston 76 is therefore guided in its cylinder by means of the guide rings 82–83 only. As previously explained, in operation the glide blocks 82 may again so adjust themselves that wedge-shaped oil films are obtained between the glide blocks and the cylinder wall. These wedge-shaped oil films are capable of taking up the large side forces on the piston, whereby metallic contact and wear between the moving parts is largely prevented. Thereby, the body 76 of the floating piston serves partly as a supporting element for the piston rings, which provide the piston seal, and for the guide rings guiding the piston in its cylinder. With conventional pistons, there is no guarantee for the formation of supporting oil films between the piston and the cylinder. The guide rings according to the invention are therefore a distinct improvement allowing to reduce friction and wear between the moving parts.

As a further example, FIGS. 21 and 22 show the application of the invention to the floating piston of a diesel engine. Also in this example, the piston is guided in its cylinder by means of two rows of glide blocks, whereby the two rows of glide blocks are axially spaced from each other. In this example, loose glide blocks 89 are provided and arranged in two grooves 92 in the piston 91, the grooves 92 being provided symmetrically on both sides of the piston pin 90 and provided with annular rims 94, respectively. The contacting surface 93 of the glide blocks 89 is flat while the contacting surface of the grooves 92 is barrel-shaped or spherical. As previously mentioned, this allows the glide blocks to adjust themselves in all directions. With the large piston pins required for diesel engines, it may not be possible to provide glide blocks over the entire circumference of the piston. Since the lateral forces on the floating piston chiefly are perpendicular to the piston pin axis, it is sufficient to provide a limited number of glide blocks on both sides of the piston pin, as is shown in FIGS. 17 and 18. In the circumferential direction, the glide blocks 89 are thereby secured by stops 95. Loose glide blocks have the additional advantage that a maximum gliding surface may be provided since no space has to be provided between the glide blocks for interconnecting resilient stays.

In comparison to the before mentioned previously known arrangement, the guiding arrangement as described in the foregoing has the following advantages. With the previously known arrangement, the supporting element must be axially divided at its groove so that the solid flange of the guide element may be taken up into the said groove. With the new arrangement on the other hand, the supporting element may be in one piece since the guide element, due to the opening provided at one place of its circumference, readily may be inserted into an undivided groove, by radial compression or expansion. Further, with the elastic contact between the guide element and the supporting element, the new design avoids the necessity for any clearance between these elements. This means increased accuracy in guidance and decreased cost of manufacture due to a smaller number of tolerances which have to be observed. Finally, the new design allows to decrease the distance between the tilting axes of the glide blocks and the gliding surface, which facilitates the adjustment of the glide blocks and the formation of a supporting liquid film.

What is claimed is:
1. A guide arrangement for piston and cylinder elements arranged on a common axis and adapted for mutually reciprocating motion comprising, in combination, a plurality of circumferentially arranged glide blocks and a circular support member for supporting said glide blocks, said support member having an integral groove with a bottom wall and two side walls, said glide blocks each having a cylindrical gliding face, said gliding face being located on a common cylindrical surface for all glide blocks, each of said glide blocks having a pair of side faces respectively facing side faces of said glide blocks adjacent thereto, and at least the side faces of a pair of glide blocks adjacent each other being completely separated from each other and defining a free space between themselves, each of said glide blocks having two end faces spaced from each other in the direction of said common axis, said end faces contacting with clearance said side walls of said groove, and each of said glide blocks having a supporting face opposite to said cylindrical gliding face, said supporting face contacting said bottom wall of said groove, and said supporting face and said bottom wall being formed to allow a tilting movement of said glide block about an axis located in a plane parallel to said common axis.

2. A guide arrangement as set forth in claim 1, wherein said side walls of said groove and said end faces of said glide blocks are flat and located in planes perpendicular to said common axis.

3. A guide arrangement as set forth in claim 1, and including resilient connecting means extending integral with said glide blocks between said side faces of all of said glide blocks with the exception of said pairs of glide blocks.

4. A guide arrangement as set forth in claim 3, wherein said resilient connecting means are located midway between said end faces of said glide blocks.

5. A guide arrangement as set forth in claim 3, wherein the radial thickness of said resilient connecting means at the most is equal to the radial thickness of said glide blocks.

6. A guide arrangement as set forth in claim 1, wherein the edges formed between said gliding face and said end faces of said glide blocks are rounded off.

7. A guide arrangement as set forth in claim 1, wherein said supporting face of said glide blocks is cylindrical and said bottom wall of said groove is convex towards said glide blocks.

8. A guide arrangement as set forth in claim 1, wherein said bottom wall of said groove is cylindrical and said supporting face of said glide blocks is convex towards said bottom wall of said groove.

9. A guide arrangement as set forth in claim 1, wherein all side faces of said glide blocks are completely separated from the side faces of the glide blocks adjacent thereto.

10. A guide arrangement as set forth in claim 1, wherein said circular support member is in the form of a floating piston, the outer surface of said floating piston being formed with a pair of said grooves spaced in axial direction from each other and each supporting a plurality of said glide blocks.

References Cited

UNITED STATES PATENTS

| | | | |
|---|---|---|---|
| 1,652,385 | 12/1927 | Walker | 92—219 |
| 2,208,898 | 7/1940 | Eichelberger | 92—219 X |
| 2,712,483 | 7/1955 | Ciaccia | 92—178 |
| 3,046,062 | 7/1962 | Wettstein | 308—4 |
| 3,155,015 | 11/1964 | Genz | 308—5 |

FOREIGN PATENTS

| | | |
|---|---|---|
| 277,862 | 9/1927 | Great Britain. |
| 329,577 | 5/1930 | Great Britain. |

MARK NEWMAN, *Primary Examiner.*

AL LAWRENCE SMITH, *Examiner.*